US005556203A

United States Patent [19]
Filias

[11] Patent Number: 5,556,203
[45] Date of Patent: Sep. 17, 1996

[54] SPLASH GUARD

[76] Inventor: Gregory M. Filias, 125-127 Daniel St., Portsmouth, N.H. 03801

[21] Appl. No.: 519,770

[22] Filed: Aug. 28, 1995

[51] Int. Cl.⁶ .................................................. B01F 15/00
[52] U.S. Cl. ........................................ 366/347; 366/129
[58] Field of Search .................................. 366/279, 347, 366/244, 245, 247, 249, 251, 255, 257, 129

[56] References Cited

U.S. PATENT DOCUMENTS

| | | | |
|---|---|---|---|
| 2,193,356 | 3/1940 | Green | 366/347 |
| 3,913,896 | 10/1975 | Hawke | 259/125 |
| 3,960,370 | 6/1976 | Bewley | 259/118 |
| 4,549,811 | 10/1985 | Schiffner et al. | 366/129 |
| 4,822,175 | 4/1989 | Barnard et al. | 366/347 |
| 5,439,289 | 8/1995 | Neilson | 366/347 |

*Primary Examiner*—Robert W. Jenkins
*Attorney, Agent, or Firm*—Hayes, Soloway, Hennessey, Grossman & Hage, P.C.

[57] ABSTRACT

A splash guard for use with an electric hand-held mixer. The splash guard has a generally cup shape, closed at its top end and open at its bottom end, and is removably attached to the underside of the mixer. The splash guard top end has a pair of holes for accommodating the shafts of the mixing elements. The splash guard is releasably attached to the mixer by means of cooperating hook and loop fasteners placed, respectively, on the top end of the splash guard and the underside of the mixer.

10 Claims, 1 Drawing Sheet

SPLASH GUARD

FIELD OF THE INVENTION

This invention relates generally to a splash guard that operates with a conventional electric mixer and, more particularly, to a removably attached, translucent splash guard designed specifically to be employed with a variety of hand-held electric mixers that utilize dual beater shafts such that the use of this disclosed splash guard eliminates the splashing of the mixing ingredients to the surrounding area.

BRIEF DESCRIPTION OF THE PRIOR ART

Previous to the disclosure, the prior art has provided a means of preventing splashing of an electric mixer by means of using a flat plane device that covers the bowl or a cup in which the mixing is performed. Among the patents bearing on this particular concept will be found the following:

| Patentee | U.S. Pat. No. | Issue Date |
| --- | --- | --- |
| Ethel M. Hawke | 3,913,896 | Oct. 21, 1975 |
| Adele L. Bewley | 3,960,370 | June 1, 1976 |
| Robert E. Schiffner et al | 4,549,811 | Oct. 29, 1985 |
| John K. Bernard et al | 4,822,175 | April 18, 1989 |

These disclosures essentially provide a flat plane that is placed on a bowl or cup in which the mixing is to occur. Further, these designs provide holes to insert the mixing elements through so that the flat plane lies between the mixer and the bowl or cup so that the flat plan will prevent splashing the user or surrounding area during the mixing process. These designs, however, are unsatisfactory at providing sufficient splash guard protection while at the same time allowing the free mobility of the mixer and the ability to easily view the mixing process. Quite often, the chore of mixing requires that the person using the mixer have free mobility of the mixer to move about the mixing bowl or cup so that the ingredients are adequately and rapidly mixed. The shape of these designs, however, restrict the mixer's movements because their designs necessarily require the mixer to remain relatively stationary primarily because these designs provide two holes in the flat plane device where the mixing elements of a mixer are inserted so that the mixer cannot move laterally and therefore the ingredients are not properly and rapidly mixed. Moreover, these designs must necessarily be large in diameter to accommodate a variety of bowl or cut sizes, making these designs cumbersome and inconvenient.

The main problem that occurs when using an electric mixer is that the rotating motion of the mixing elements tends to draw the mixing ingredients upward toward the mixer and then splash outward. The aforementioned designs fail to account for this phenomenon because the flat plane device of these disclosures can easily be lifted off the mixing bowl and the user or surrounding area could get splashed.

The present invention provides a novel means of splash guard protection for the user and surrounding areas against splashes while at the same time allowing the user to operate the mixer freely, so that the aforementioned drawbacks are overcome, and accomplished by a splash guard that has a general cup shape and is removably attached to the mixer and substantially surrounds the mixing elements of the mixer.

SUMMARY OF THE INVENTION

It is thus a primary object of the present invention to provide a splash guard for an electric hand-held mixer or for a stationary mixer that has characteristics of a hand-held mixer, wherein the cup shape of the splash guard provides full splash protection.

It is another object of the present invention that the splash guard, as above, provide full splash protection while being removably attached directly to the mixer unit, thereby facilitating free movement of the mixer, both laterally and vertically, to ensure better mixing.

It is yet another object of the present invention to provide a splash guard, as above, that has holes in the flat, closed end portion such that the splash guard can accommodate a variety of mixing elements.

It is still a further object of the present invention to provide a splash guard, as above, that can be easily mounted and dismounted on the mixing unit to facilitate easy cleaning.

It is still a further object of the present invention that the splash guard disclosed herein is of uniform thickness.

It is still a further object of the present invention that the splash guard disclosed herein is of a translucent polymer to allow easy viewing of the mixing process.

BRIEF DESCRIPTION OF THE DRAWINGS

These and other objects of the present invention, which will become apparent from the following detailed description taken with the accompanying drawings, wherein like numerals depict like parts, and wherein.

DETAILED DESCRIPTION OF THE PREFERRED EMBODIMENT

Figure 1:
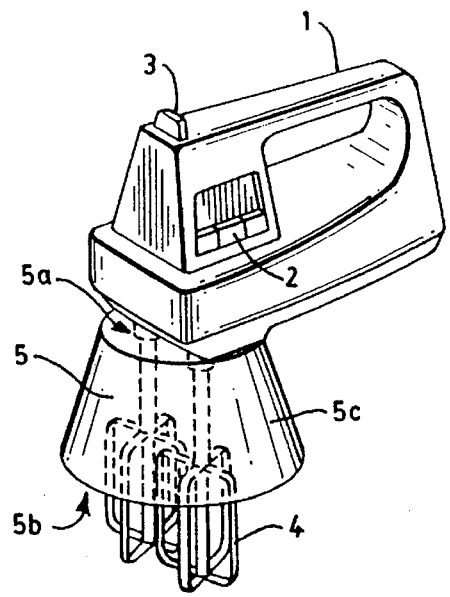
FIG. 1 is a perspective view of a typical electric hand-held mixer, mixing elements, and the splash guard of the present invention in normal use.

Referring to FIG. 1, there is shown a typical electric hand-held mixer 1, the mixing elements 4 and the splash guard 5 disclosed herein that is removably attached to the mixer powerhead 1. The typical electric hand-held mixer powerhead 1 having a mixing element 4 ejector button 3 and switch means 2 to turn on or off and adjust the power of the mixing elements 4. The splash guard 5 extends downwardly from the underside of the mixer powerhead 1 so as to surround the mixing elements 4, in part. The shafts of the mixing elements 4 are inserted through circular holes 6 in the splash guard 5 and inserted into the drive sockets of the mixer powerhead 1. The splash guard 5 has a generally cup-like shape and includes a circular, flat top wall 5a, an open bottom end 5b and generally vertical side wall 5c that extends downwardly from the perimeter of the circular, flat top wall 5a and terminates at the bottom end 5b. The top wall contains means 7 to attach the splash guard 5 to the underside of the mixer. The generally vertical sides 5b terminate below the top end 5a to define the circular, open bottom end which is parallel to the top end 5a. The open bottom end 5c has a larger diameter than that of the top end 5a so that the splash guard 5 has a downwardly flaring cup shape.

The typical electric hand-held mixer powerhead 1 is of the type with dual parallel mixing elements 4 that extend downwardly from the underside of the mixer powerhead 1. In use, the splash guard 5 is removably attached to the underside of the mixer powerhead 1 so that the mixing elements 4 are surrounded in part by the splash guard 5 which extends downwardly to a point that is less than the total length of the mixing elements 4, i.e. so that a portion of the mixing elements 4 extend beyond the open bottom end 5c of the splash guard 5 so as not to interfere with the mixing process.

Figure 2:
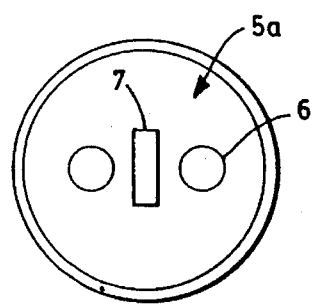
FIG. 2 is a top view of the splash guard of the present invention.
Figure 3:
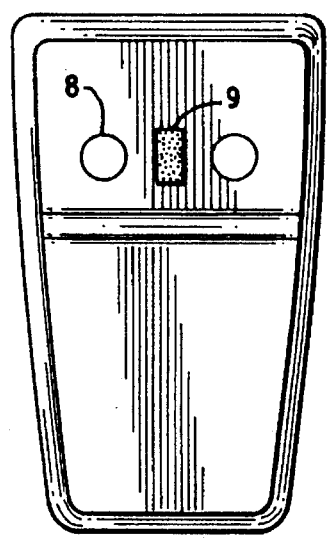
FIG. 3 is a bottom view of the under side of a typical electric hand-held mixer.

Referring to FIG. 2 which is a top view of the splash guard 5, two circular holes 6 preferably located on the center line axis of the diameter of the top end 5a are provided so as to permit the shafts of the mixing elements 4 to be inserted through the top end 5a. Means 7 for attaching the top end 5a to the underside of the mixer powerhead 1 is located between the holes 6 and centered on the center line axis of the diameter of the top end 5a. Preferably, means 7 comprises one half, i.e. the hook or loop half of a strip of hook and loop fastening tape or the like, for engaging with the other hand 9 which is located on the underside of the mixer powerhead (FIG. 3). Mixer powerhead 1 includes two drive sockets 8 wherein the mixing elements 4 are inserted. The two holes 6 in the top end 5a of the splash guard are of such diameter that they align with the two drive sockets 8 so that the mixing elements 4 can be inserted through the top end 5a and into the drive sockets 8 with ease.

Figure 4:
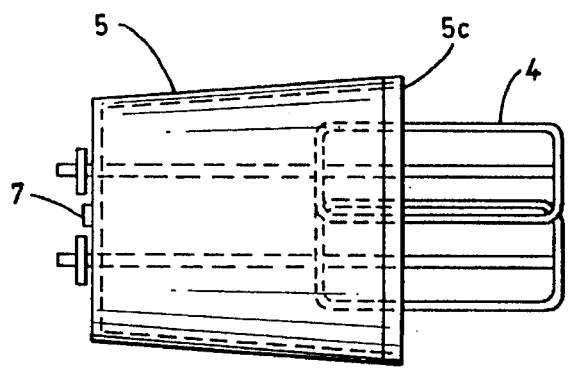
FIG. 4 is a side view of the splash guard of the present invention surrounding the mixing elements of an electric hand-held mixer in normal use.

As can best be seen in FIG. 4, the total length of the splash guard 5 should be less than that of the mixing elements 4 so that when the splash guard 5 is installed in place on the mixer power head, the mixing elements extend in part beyond the bottom end 5c of the splash guard so that the splash guard will not hinder the mixing process.

Features and advantages of the present invention resides in the splash guard's simplicity, low cost and ease of use. With reference to the aforementioned figures, the splash guard 5 is simply and easily attached to the underside of the mixer powerhead 1, by the attachment means 7 and 9, with the two holes 6 on the top end 5a aligned with the drive sockets 8 for the mixing elements 4. The mixing elements 4 are inserted into the splash guard 5 and through the top end 5a and inserted into the drive sockets 8. When the user is finished mixing, the user can eject the mixing elements 4, using the ejector button 3, and then simply remove the splash guard 5 so that it can be cleaned. The splash guard 5 preferably is of uniform thickness and made of a shatterproof, dishwasherproof, translucent polymer so that the splash guard 5 can be easily handled and cleaned. This simple yet effective design provides the user with a quick, easy way to achieve splash guard protection while maintaining the mobility of the mixer.

I claim:

1. A splash guard for use with a food mixer, said splash guard comprising:

a partial enclosure open at one end, and means for releasably affixing said splash guard to said mixer, said means for affixing said splash guard comprising hook and loop fastening means.

2. A splash guard as claimed in claim 1, wherein said splash guard includes sides which extend downwardly from said top end.

3. A splash guard as claimed in claim 1 wherein said top end comprises at least one hole for accommodating the shaft of a mixing element.

4. A splash guard as claimed in claim 1, wherein said splash guard includes an open bottom end.

5. A splash guard for use with an electric hand-held mixer of the type comprising a powerhead for accommodating a pair of mixing elements, each having a shaft and a mixing agitator depending therefrom, said splash guard being removably attached to the underside of said powerhead and extending from said powerhead and surrounding said mixing elements in part, the splash guard covering the top of the mixing agitator and terminating above the bottom of the mixing agitator, the splash guard being shaped as a generally tapered cylinder which can fit within the open end of a mixing bowl.

6. A splash guard for use with an electric hand-held mixer of the type comprising a powerhead for accommodating a pair of mixing elements, each having a shaft and a mixing agitator depending therefrom, said splash guard being removably attached to the underside of said powerhead and extending from said powerhead and surrounding said mixing elements in part, said splash guard comprising a cup-shaped cylinder which is defined by a generally solid top end, an open bottom end and solid side walls which extend downwardly from said top end.

7. A splash guard as claimed in claim 6, wherein said top end has holes for accommodating the shafts of said mixing elements.

8. A splash guard as claimed in claim 6, wherein said side walls flare outwardly adjacent the open bottom end.

9. A splash guard as claimed in claim 6, wherein said splash guard is removably attached to said underside of said powerhead by means of cooperating hook and loop fastening means attached, respectively, to said splash guard and said powerhead.

10. A splash guard as claimed in claim 6, wherein a portion of said mixing agitators extend beyond the bottom end of said guard.

\* \* \* \* \*